June 7, 1955
H. W. ANDREWS ET AL
2,710,250
APPARATUS FOR THE CONTINUOUS LIQUID-LIQUID SOLVENT
EXTRACTION OF INORGANIC SALT IMPURITIES
FROM ORGANIC SALT SOLUTIONS
Filed Feb. 8, 1950
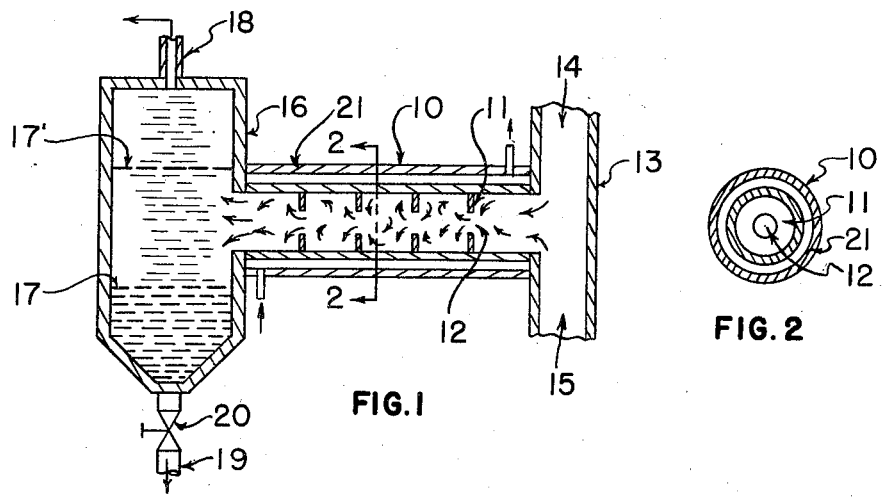
FIG. 1
FIG. 2
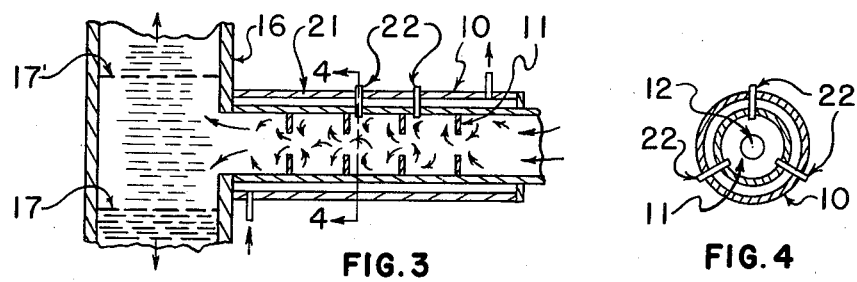
FIG. 3
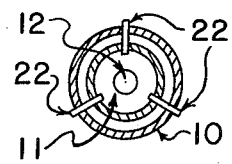
FIG. 4
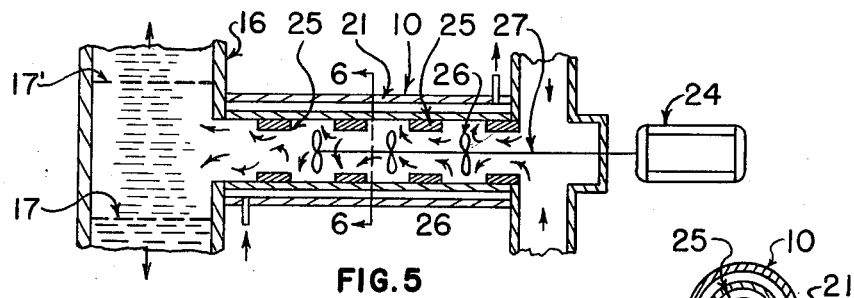
FIG. 5
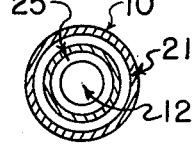
FIG. 6
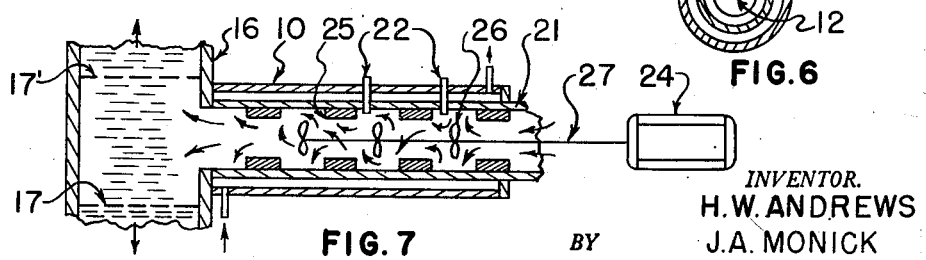
FIG. 7
INVENTOR.
H. W. ANDREWS
J. A. MONICK
BY

United States Patent Office 2,710,250
Patented June 7, 1955

2,710,250

APPARATUS FOR THE CONTINUOUS LIQUID-LIQUID SOLVENT EXTRACTION OF INORGANIC SALT IMPURITIES FROM ORGANIC SALT SOLUTIONS

Herbert W. Andrews, Westfield, N. J., and John A. Monick, New York, N. Y., assignors to Colgate-Palmolive Company, Jersey City, N. J., a corporation of Delaware Application February 8, 1950, Serial No. 143,141

2 Claims. (Cl. 23—267)

This invention relates to the purification of organic sulfate and sulfonate salts and more particularly to a process and apparatus for removing inorganic salts from such organic salts in a continuous manner utilizing a liquid-liquid extraction method.

In the preparation of organic surface-active compounds, especially sulfated and sulfonated organic compounds which are produced by the neutralization of a reaction product formed by sulfonating various organic materials, as a result of the neutralization there are formed both organic sulfate and/or sulfonate salts and inorganic salts of the sulfonating agent, the inorganic salts occurring as a by-product impurity in the organic sulfonate product. For example, where sodium hydroxide is used to neutralize sulfonic acid compounds, in addition to the formation of the sodium salt of organic sulfonate, sodium sulfate is formed as a result of the reaction of alkali with the sulfuric acid present upon completion of the sulfonation reaction. Similarly, where an organic base is used for the neutralization the resulting reaction mixture includes the sulfate or sulfonate of the cation of the organic base.

For some products, such as industrial and household detergents, the presence of a certain proportion of inorganic sulfate in the final products is beneficial and is thus included. For many other products and uses, however, it is desirable to employ the organic sulfonate or sulfate free of inorganic by-product salts. Accordingly, where the purified organic sulfonate or sulfate product is desired it necessitates the removal of the undesired inorganic salts which are dissolved in the aqueous solvent along with the organic sulfonated or sulfate material.

Various methods and apparatus have been suggested for effecting the removal of the inorganic salts from organic salt, but such methods have many disadvantages which militate against their satisfactory use in commercial practice. Attempts to employ ordinary column extraction methods have not solved the problem because of the difficulty in providing adequate mixing of the materials so that efficient extraction and separation of the organic salts can be accomplished. Where batch operational methods are employed, large quantities of material are in the process of being treated at a given time which involves the use of numerous tanks and auxiliary equipment, and necessitates the provision of increased floor space to accommodate the same. Further, where insolubilizing methods for separating inorganic salts from organic salts are employed, filtration apparatus is required. Such equipment and facilities for handling and storing large quantities of materials are expensive and necessarily increases the cost of producing the finished product. The present invention provides a method and apparatus for effecting the purification of such organic sulfate and sulfonate salts as a continuous method which provides for improved mixing and contacting of the components, and eliminates the need of batch operating storage facilities. The process and apparatus are readily adapted for commercial application as a continuous operation.

In accordance with the present invention, a liquid salt mixture comprising organic acid salt and inorganic acid salt dissolved in a common solvent is continuously separated by the introduction of a quantity of a solvent which selectively dissolves certain salts of the mixture and forms a solution thereof which is of different specific gravity than the remainder of the liquid. The liquid body containing the salt mixture is thoroughly mixed with the selective solvent as the same flows along in a continuous stream through a mixing and agitation zone from which the material is discharged into a calming zone, wherein the different specific gravity liquids are allowed to separate into two liquid layers which are continuously drawn off. The selective solvent is intimately admixed with the salt solution under controlled optimum temperature conditions in the mixing zone, following which the solvent-salt mixture passes into the calming zone wherein the immiscible liquid phases separate into two liquid layers.

In the preferred embodiment, the liquid mixture containing the selective solvent is thoroughly agitated while flowing along toward an inner communicating vertically disposed column or chamber which provides a relatively quiescent zone through which the liquid continues to flow vertically while separating into two different liquid layers and forming an interface. One layer contains a small portion of the common solvent, practically all of the selective solvent and substantially all of the salts which are selectively dissolved by the latter. The other layer contains practically all of the common solvent, a small portion of the selective solvent and substantially all of the salts which are not selectively dissolved by the latter. These two layers are drawn off continuously from the top and bottom part of the calming zone, the rate of withdrawal being controlled so as to maintain the interface within the desired section of the calming zone. Upon separation of the two liquid layers the selective solvent may then be removed, as by evaporation, to produce a purified salt product free from salts which are not dissolved in the selective solvent.

Among the organic solvents which may be used as the selective solvent in practicing the invention, the short-chain aliphatic alcohols have been found especially useful, such as those having up to about 6 carbon atoms, e. g. methanol, ethanol, isopropanol, n-butanol, n-hexanol, etc. Other solvents may be used, such as fatty acid mono-esters of polyhydric alcohols, e. g. mono-glycerides of coconut oil fatty acids, ethylene glycol mono-esters of fatty acids, etc. Other solvents which preferentially dissolve the organic sulfate and sulfonate salts in the presence of water containing dissolved inorganic salts may be employed whether such organic solvents are classed as miscible, partly miscible or immiscible with water. Such solvents include dioxane, ethylene glycol monoethyl ether, diethylene glycol monoethyl ether and the like.

An example of a liquid extraction process in which the process and apparatus of the invention may be used is that of purifying alkali metal salts of fatty acid monogylcerides of coconut oil with the use of isopropyl alcohol. In this instance an aqueous solution containing alkali metal sulfate salts of the coconut oil fatty acid monogylceride and alkali metal sulfate is brought together with isopropyl alcohol in the mixing zone of the apparatus and thoroughly agitated so as to disperse the alcohol throughout the salt solution. Thereafter the two-phase liquid mixture is passed to the calming zone whereupon the two phases separate as immiscible liquid layers with the formation of an interface. The upper layer, comprising practically all of the isopropyl alcohol and substantially all of the fatty acid monoglyceride sulfonic acid salts, is continuously withdrawn from the upper part of the calming zone while the heavier aqueous liquid layer containing substantially all of the alkali-metal sulfate is continuously withdrawn from the lower part of the calming zone.

Other salt solution mixtures which may be processed in accordance with the invention are alkyl aryl sulfonate salt solutions which contain inorganic sulfate as a by-product salt. Other suitable organic solvents may be used as the selective organic extracting solvent similarly as described in the liquid-liquid separation of monoglyceride sulfate salt solution from inorganic sulfate salt solution.

The drawing illustrates diagrammatically an apparatus and suitable modifications thereof which are adapted for use in carrying out the liquid-liquid extraction process of the invention.

Fig. 1 is a vertical cross-sectional view of an apparatus, shown partly broken away, and illustrating the use of a horizontally disposed mixing section with communicating vertical separating column for providing liquid-liquid separation; Fig. 2 is a view in cross section taken on the line 2—2 of Fig. 1; Fig. 3 is a vertical cross-sectional view of a modification of the construction shown in Fig. 1, and showing the separating column and manifold section partly broken away, wherein provision is made for introducing water and the selective organic solvent in the mixing section or zone of the apparatus; Fig. 4 is a view in cross section taken on the line 4—4 of Fig. 3 and illustrating the use of angularly disposed nozzles for introducing organic solvent or water into the mixing section of the apparatus; Fig. 5 is a vertical cross-section view similar to Fig. 3, with certain parts broken away, and illustrating a modified apparatus in which the mixing zone is provided with a mechanical stirring mechanism, and wherein the mixing section of the apparatus is provided with baffles to increase the mixing efficiency of the apparatus; Fig. 6 is a view in cross section taken on the line 6—6 of Fig. 5 and illustrating the baffle arrangement; and Fig. 7 is a cross-sectional view similar to Fig. 5 and illustrating a modification thereof wherein provision is made for introducing the organic solvent and water in the mixing zone similarly as illustrated in Figs. 3 and 4.

Referring to the drawings, wherein like reference characters refer to like parts throughout the several figures, the apparatus, as illustrated in Fig. 1, comprises an elongated cylindrical mixing section 10 which is provided with inner baffles 11 which are spaced lengthwise of the section and define central openings 12 constituting mixing orifices. Salt solutions being treated, which may be previously diluted with water, are introduced into the mixing section 10 through a manifold 13 as at 14. Organic extracting solvent is introduced at 15, and the resultant liquid mixture flows through the mixing section and thence to the separating column 16 as indicated by the arrows.

The separating column 16, is of larger diameter than the mixing section 10, and is arranged to receive liquid discharged from the mixing section centrally between the top and bottom of the column. Separating column 16 functions to form a calming zone for the agitated material which enters the column from the mixing section 10 and thus permits the solution to become calm or quiescent such that the liquids of different specific gravity separate into two liquid layers forming an interface, as indicated at 17.

Provision is made for allowing the continuous discharge of the lighter specific gravity liquid layer from the top of the separating column 16 as shown at 18, while the heavier liquid layer is drawn off from the bottom of the column as by means of the conduit 19. A valve 20 located in line 19 permits control of the discharge rate of liquid drawn from the bottom of the separating column whereby the interface may be located at any desired place in the calming zone. For example, by restricting the rate of withdrawal of the heavier liquid layer from the bottom of the column, the interface 17 may be raised to a position such as indicated by the dotted line 17'.

A jacket 21 is provided around the mixing section and suitable fluent for heating or cooling the section is circulated therethrough to maintain the desired temperature during mixing of the materials.

In Fig. 3, a modified apparatus is provided wherein provision is made for introducing the organic solvent and water through angularly spaced nozzle jets 22. Fig. 4 illustrates in more detail the arrangement of the nozzles for introducing the organic solvent and water into the mixing section 10.

A further modification of the mixing section as illustrated in Fig. 1 is shown in Fig. 5 wherein provision is made for agitating the mixture by the use of a motor-driven stirring mechanism 24. In this modification the orifice mixing baffles shown in Fig. 1 are replaced by the modified baffles 25. The propeller blades 26 on the shaft 27 are located between the baffles as shown. The blades 26 are of a desired shape and spacing on the stirring shaft whereby upon operation of the stirrer the liquid flowing through the mixing section 10 is forced outward and over the baffles 25 and thoroughly intermingled before being discharged into the separating column 16.

In Fig. 7 a similar mixing section is shown as that illustrated in Fig. 3, wherein provision is made to introduce the organic extracting solvent and also the water, where necessary, through the nozzle jets 22 similarly as illustrated in Figs. 3 and 4.

During use of the apparatus, the liquid material containing organic and inorganic salts which are to be separated is admitted to the manifold section of the apparatus and flows through the mixing zone where the material is thoroughly agitated and the organic extracting solvent intimately mixed and dispersed throughout the liquid mixture, the rate of flow of liquid from the separating column being so controlled that the interface will be located either above or below the entrance of the liquid into the separating column. During mixing and separation of the liquid the temperature of the solution is controlled so as to maintain the salts in solution, or substantially so, in order to prevent precipitation such as would interfere with or clog the apparatus. A small amount of precipitation may be permitted where the precipitating salt is of such a nature that the same can be drawn off continuously from the separating column.

Employing the apparatus illustrated and described for continuously separating aqueous salt solutions, such as comprise a mixture of sodium salt of fatty acid monoglycerides and sodium sulfate, the salt solution is diluted with water where the same is in concentrated form, and thereafter the material is flowed into the mixing zone where the organic solvent is introduced and thoroughly agitated and dispersed throughout the liquid mixture. Where it is desired to introduce the organic solvent prior to subjecting the same to agitation and mixing in the apparatus, it will be understood that the same may be introduced prior to passage of the material into the mixing zone, as shown in the modified form of the apparatus, and illustrated in Figs. 1 and 5.

The following typical examples are illustrative of how the invention may be utilized.

*Example 1*

To a mixture comprising 100 pounds of an aqueous solution (containing, by weight, 14% sodium salt of sulfated monoglycerides of coconut oil and 32% sodium sulfate) was added 15 pounds of water and 12.6 pounds of isopropyl alcohol (75% by wt. alcohol 25% water). The mixture is pumped through a mixing and liquid separating apparatus such as illustrated in the drawings, the alcohol and aqueous salt solution being thoroughly mixed while heated to a temperature of about 40° C. After mixing the liquids at the controlled temperature, the mixture is passed into the larger vertically disposed separating column in which separation occurs due to the difference in specific gravity between the liquid phase consisting principally of isopropyl alcohol containing substantially all the sodium salt of sulfated monoglyceride dissolved therein and the aqueous liquid phase containing practically all of the sodium sulfate. The two separated liquid solutions are continuously withdrawn from the separating column at a rate such as to maintain the interface a few inches below the central opening in the column where the agitated mixture enters the column.

The isopropyl alcohol liquid solution passing from the top of the separating column is evaporated to recover the purified sodium salt of sulfated coconut oil monoglycerides and the isopropyl alcohol.

*Example 2*

A liquid mixture as described in Example 1, but containing the ammonium salt of sulfated monoglycerides of coconut oil and ammonium sulfate, is treated as described to recover the ammonium salt of the monoglycerides in substantially pure form. In this instance ethyl alcohol is used as the organic solvent in place of isopropyl alcohol.

*Example 3*

To 100 pounds of an aqueous solution (containing by weight approximately 23.5% sodium salt of alkyl aryl sulfonate and 18.1% sodium sulfate) is added 29.2 pounds of isopropyl alcohol (75% by wt. isopropyl alcohol). The mixture is then thoroughly agitated at a temperature of approximately 49° C. as described in Example 1. The mixture separates into two immiscible liquid layers in the calming zone of the separating column, and an upper alcohol extract layer is recovered containing substantially all of the alkyl aryl sulfonate.

An important aspect of the invention comprises the intimate mixing and dispersion of the organic solvent throughout the salt solution as the same flows continuously through the mixing zone of the apparatus and into the separating column. The apparatus and method thus provides for vigorous and efficient dispersion and intermixing of the organic extracting solvent with the aqueous salt solution as the same flows through the mixing zone, and which heretofore has not been effected satisfactorily with conventional column extraction methods. The lighter organic liquid layer which separates from the heavier aqueous salt layer in the column is continuously withdrawn from the top of the separating column, while at the same time the heavier aqueous liquid containing the inorganic salt is continuously withdrawn from the lower or bottom part of the column. In this manner there is provided a simplified method and apparatus for continuously concentrating or purifying aqueous solutions of organic sulfate and/or organic sulfonate material whereby the inorganic salt by-product impurity is removed.

In the purification of organic sulfate or sulfonate salts by removal of inorganic salts therefrom, it has been observed that the concentration of the inorganic salt at a given temperature affects its solubility. For example, the maximum solubility of sodium sulfate in water is attained at about 32.5° C. so that if a saturated solution of sodium sulfate is prepared at 32.5° C. and the temperature is thereafter allowed to change, some precipitation will result. The optimum temperatures of treatment for most efficient operation vary with different solutes and solvents used. In general, temperatures within a range of about 25° to about 70° C. may be used. A preferred temperature range for the treatment of sodium salts of the sulfuric acid esters of coconut oil fatty acid monoglycerides containing 35% solids (in the ratio of about 65% to 35% by weight of sodium sulfate to the sulfuric acid ester monoglyceride salt respectively) is on the order of about 30° to 50° C.

A minimum quantity of organic solvent is required to produce a liquid phase separation of the aqueous inorganic salt solution. The approximate minimum amount of various organic solvents which may be employed and which will cause a separation in each of a number of aqueous salt solutions is set out in U. S. Patent 2,316,719. It will thus be understood that in carrying out the process of the present invention certain precautions as regards temperature and proportionate amount of organic solvent used will be observed to bring about desired liquid phase separation and prevent substantial precipitation of inorganic salts in the separating column.

The relative dimensions of the apparatus and the materials from which the same is constructed obviously may be varied to suit the particular salt solution being treated and the volume which is to be processed. For instance, where it is desired to provide a longer time for mixing and agitating the aqueous salt solution and the selective solvent, the length of the mixing section will be increased or the flow of the material through the mixing zone reduced or both to accomplish this. The shape and design of the baffles and intermixing orifices also may be other than that illustrated. A tank may be used instead of a vertical separating column. Likewise, the size and shape of the stirring propeller blades may be varied to suit different conditions and uses, and the rotational speed of the stirrer varied to provide for the most efficient agitation and intermixing of the materials.

Although the present invention has been described in connection with the treatment of aqueous solutions containing organic sulfate and organic sulfonate salts containing inorganic salts it will be appreciated that the apparatus and process is applicable for treating other solutions wherein extracting solvents are utilized to form liquid layers of different specific gravity in a continuous manner, and that various equivalents can be substituted for the materials mentioned herein without departing from the principles and spirit of the invention.

What is claimed is:

1. Apparatus for effecting the separation of organic salts from inorganic salts by liquid-liquid solvent extraction from an aqueous solution containing said organic and inorganic salts, comprising a mixing section, means for introducing said aqueous solution and an organic solvent for said organic salts into said mixing section, means comprising spaced baffle members in said mixing section defining openings which constitute mixing orifices to cause intermingling and agitation of the liquids as the same flow along therethrough, a vertically elongated separating column in communication with said mixing section through an inlet opening intermediate the top and bottom thereof for admitting liquids discharged from said mixing section, said column being of relatively larger cross-sectional area than said mixing section, and means for continuously withdrawing the solvent extract and residual aqueous solution at locations above and below said inlet opening, respectively.

2. Apparatus for effecting the continuous separation of organic salts from inorganic salts by liquid-liquid solvent extraction from an aqueous solution containing said organic and inorganic salts which comprises a horizontal mixing section, means for introducing said aqueous solution and an organic solvent for said organic salts into said mixing section, means comprising spaced baffle members in said mixing section defining openings which constitute mixing orifices to cause intermingling and agitation of the liquids as the same flow therethrough, means comprising a heat exchanger for controlling the temperature of said mixing section, a vertically disposed separating column in communication with the discharge outlet of said mixing section, said column being provided with an inlet opening intermediate the top and bottom of said column for admitting liquid discharged from said mixing section, said column comprising an elongated section for quieting the agitated liquids discharged from the mixing section whereby the liquids flowing thereinto tend to separate into two liquid layers, said column having an outlet above the point where agitated solution discharged from said mixing section is introduced into the column for continuously removing the uppermost liquid layer and an outlet below said solution entrance point for drawing off material from the lower part of said column.

References Cited in the file of this patent

UNITED STATES PATENTS

| | | |
|---|---|---|
| 1,864,911 | Jodeck | June 28, 1932 |
| 2,028,185 | Bird | Jan. 21, 1936 |
| 2,110,899 | Woelflin | Mar. 15, 1938 |
| 2,129,896 | Whiteman | Sept. 13, 1938 |
| 2,266,521 | Van Dijk | Dec. 16, 1941 |
| 2,303,582 | Russell et al. | Dec. 1, 1942 |
| 2,316,719 | Russell | Apr. 13, 1943 |
| 2,511,043 | Busch | June 13, 1950 |